G. B. Brayton.
Making Eyelets.
No. 84,673.      Patented Dec. 8, 1868.
Fig; 2.
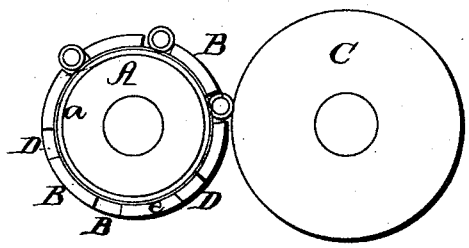
Section through Cylinders
Fig; 1.
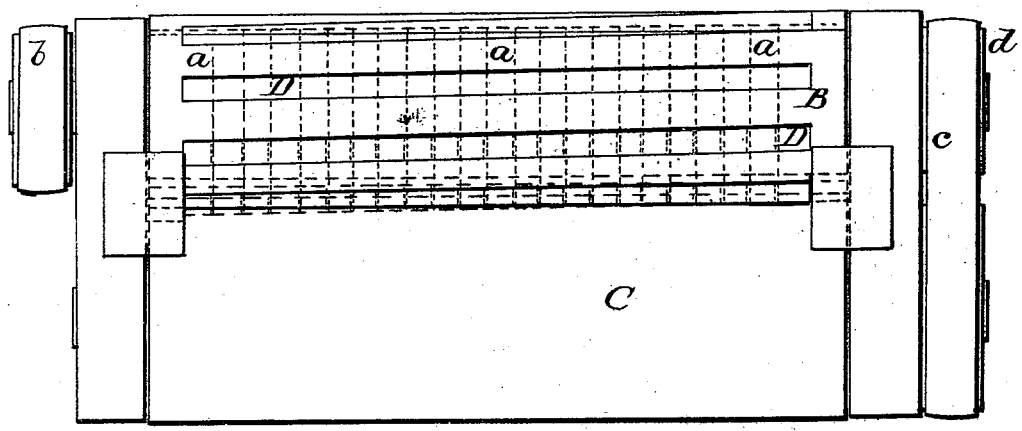
Fig 3
Witnesses;
William W. Rickard.
James W. Stillman
Inventor;
Geo. B. Brayton

GEORGE B. BRAYTON, OF PROVIDENCE, RHODE ISLAND.

*Letters Patent No. 84,673, dated December 8, 1868.*

IMPROVEMENT IN MACHINE FOR CUTTING EYELETS.

The Schedule referred to in these Letters Patent and making part of the same.

*To all whom it may concern:*

Be it known that I, GEORGE B. BRAYTON, of Providence, in the county of Providence, and State of Rhode Island, have invented a new and useful Improvement in Machinery for Preparing Blanks for Eyelets; and I do hereby declare that the following specification, taken in connection with the drawings, making a part of the same, is a full, clear, and exact description thereof.

Figure 1 is a plan of the machine.

Figure 2 is a sectional view.

Figure 3 shows, in side view and in section, the tubing used in making the eyelets, and upon which the machine herein described is to operate.

This machine is especially designed for cutting into short sections, of suitable length to be subsequently swaged into eyelets, metallic tubes, which have been prepared of the proper size for such manufacture. It can, however, with equal advantage, be employed for cutting tubes or rods into sections for any other purpose.

My invention comprehends a structure wherein a series of revolving cutters is employed, against the edges of which, in succession, the tube is pressed while it lies in a channel or groove made upon a slightly-spiral line in a jacket or casing which surrounds the series of cutters, and being made to revolve, causes each tube, in succession, to be brought to bear against the surface of a pressure-cylinder, revolving in a contrary direction to the cutters, which, in combination with the revolving cutters, and the incidental rotary movement which is transmitted to the tubes themselves, from the friction of their surfaces with the surface of the pressure-cylinder, effects the cutting of the tubes into sections.

In the accompanying drawings—

A is a cylinder, suitably mounted in bearings in a frame.

*a*, fig. 2, is one of the series of circular cutters, arranged at equal distances apart, fig. 1, upon a common shaft, the spaces between the cutters being occupied by washers, so as to form the cylinder A, as shown. The distance at which the cutters are placed apart will determine the length of the sections into which it is proposed to cut the length of tubing, fig. 3, to make the eyelet-blanks. A rotary movement may be given to this cutter-cylinder by a belt, *b*, or in any other convenient way.

The cylinder A, with its series of cutters *a*, is surrounded by a casing or jacket, B, hereafter to be described, which is also suitably mounted in bearings, and which, by means of a belt, *c*, passing around a pulley, *d*, upon its axle, is made to revolve. The belt *c* also gives a rotary movement to a pressure-cylinder, C, whose relation to the series of cutters *a a* and revolving casing B is shown in the sectional view, fig. 2.

It will be observed that the revolving casing or jacket B is pierced with long and narrow openings, D, which expose the edges of the cutters. The number of these openings may be as great as the casing can contain and leave sufficient strength of material in the intermediate portions or bars, *e*, to perform the office which is required of them. Each of these openings is intended as a depository for a length of tubing, and they are to be kept supplied by an attendant. It is preferred not to make them parallel with the axis of the hollow cylinder, but slightly inclined therewith, so as to occupy a spiral line, the object of which is to enable a portion only of the surface of a length of tubing to be brought into contact with the cutters at any one time, and by thus bringing the cutters successively into action, prevent the tube from being elongated, as it would be liable to be if all the cutters were employed at the same time.

Let it be supposed that the several openings in the hollow cylinder B have been supplied with a length of tubing, and that the machine has been put into operation. As already stated, the series of cutters is rapidly rotated, and the hollow surrounding-jacket or casing B, as well as the pressure-cylinder C, has also a rotatory movement.

Each length of tubing will, obviously, as the jacket revolves, have its surface pressed upon by the surface of the cylinder C, and be forced against the edges of so many of the revolving cutters at the same time as is allowed, by the fact that the channel in which such length of tubing rests is inclined to the axis of the cutters, as well as to that of the pressure-cylinder C. The degree of such inclination will determine what portion of the surface of the tube shall be acted upon at any one time by the cutters, but its entire surface will obviously, as the tubing is carried along, be progressively brought to the cutters.

The tubing being held in place by the edge of the groove, within which it is placed, the pressure of the surface of the cylinder C against it causes it to revolve, so that by the time the tubing has passed (by the revolution of the casing B) the line of contact with the surface of the pressure-cylinder C, it will be cut into as many sections as there may be cutters. As the casing revolves further, these sections of tubing, which are now eyelet-blanks, are discharged by their own gravity.

What I claim as my invention, and desire to secure by Letters Patent, is—

An apparatus for cutting tubing into sections, for eyelet-blanks or other purposes, consisting of a series of revolving cutters, *a a*, a surrounding revolving jacket, B, for holding and conveying the tubing, and a pressure-cylinder, C, all in combination, substantially as described, for the purposes specified.

Also, making the openings D in the jacket or casing B, for holding and conveying the tubing inclined to the axis of the series of cutters *a a*, as herein set forth, for the purposes specified.

GEO. B. BRAYTON.

Witnesses:
WILLIAM W. RICKARD,
JAMES W. STILLMAN.